US012807019B2

(12) United States Patent
Liu et al.

(10) Patent No.: US 12,807,019 B2
(45) Date of Patent: Nov. 24, 2026

(54) CHARGING GUN HOLSTER

(71) Applicant: LITE-ON TECHNOLOGY CORPORATION, Taipei (TW)

(72) Inventors: I-Hsin Liu, Taipei (TW); Li-Yuan Hsu, Taipei (TW)

(73) Assignee: LITE-ON TECHNOLOGY CORPORATION, Taipei (TW)

( * ) Notice: Subject to any disclaimer, the term of this patent is extended or adjusted under 35 U.S.C. 154(b) by 497 days.

(21) Appl. No.: 18/613,157

(22) Filed: Mar. 22, 2024

(65) Prior Publication Data

US 2025/0236191 A1 Jul. 24, 2025

(30) Foreign Application Priority Data

Jan. 23, 2024 (TW) ................................ 113200814

(51) Int. Cl.

*B60L 53/31* (2019.01)
*B60L 53/16* (2019.01)
*H01R 13/60* (2006.01)
*H02J 7/70* (2026.01)

(52) U.S. Cl.

CPC ............... *B60L 53/31* (2019.02); *B60L 53/16* (2019.02); *H01R 13/60* (2013.01); *H02J 7/70* (2026.01)

(58) Field of Classification Search

CPC .......... B60L 53/14; B60L 53/16; B60L 53/30; B60L 53/31; H01R 13/60

See application file for complete search history.

(56) References Cited

U.S. PATENT DOCUMENTS

2024/0017632 A1* 1/2024 Lehmann ................ B60L 53/11
2024/0198825 A1* 6/2024 Shum ..................... H01R 13/60
2026/0077663 A1* 3/2026 Lai .......................... B60L 53/16

FOREIGN PATENT DOCUMENTS

CN 102683987 A 9/2012
CN 107658598 A 2/2018
CN 219789915 U 10/2023
DE 202021104295 U1 * 8/2022 ............. B60L 53/31

OTHER PUBLICATIONS

Machine translation of DE 202021104295 U1; Sep. 2022 (Year: 2022).*

* cited by examiner

*Primary Examiner* — Jared Fureman
(74) *Attorney, Agent, or Firm* — WPAT, PC

(57) ABSTRACT

A charging gun holster for mounting a first charging gun or a second charging gun, includes a housing. The housing includes a socket inside, and the socket is formed by a circular groove connected to a cave, which the circular groove is formed by a first inner wall and the cave is formed by a second inner wall. The cave is configured to engage a head of the second charging gun. The circular groove is configured to engage a head of the first charging gun, and a first side of the housing is against a body of the first charging gun to limit the depth of the first charging gun inserting into the annular groove.

18 Claims, 7 Drawing Sheets

CHARGING GUN HOLSTER

This application claims the benefit of Taiwan application Serial No. 113200814, filed Jan. 23, 2024, the disclosure of which is incorporated by reference herein in its entirety.

BACKGROUND OF THE INVENTION

Field of the Invention

The present disclosure is directed to charging gun holsters, e.g., charging gun holsters for engaging different types of charging guns for the electric vehicles (EVs).

Description of the Related Art

Electric vehicles (EVs) are becoming popular in the market, and the demand for charging EVs is also increasing. Since the relevant technology is still developing, there are various specifications and models (types) of charging guns for charging electric vehicles, which means that the shapes of various types of charging guns are different. Depending on various factors, these specifications (shapes) may continue to improve and change. Since the electric vehicle charging gun is a precision device and has a certain weight, it needs to be well fixed or placed when the charging gun is used safely. Typically, a charging gun holster is used to secure or place the charging gun. However, the specifications (shapes) of the charging gun may continue to improve and change, thus replacing the charging gun holster corresponding to various type of charging gun requires additional costs of designing, manufacturing, installing and likes.

SUMMARY OF THE INVENTION

The present disclosure is directed to a charging gun holster for engaging different types of charging gun for EVs, to reduce additional costs of designing, manufacturing, installing and likes for replacing the charging gun holster corresponding to various types of charging gun.

According to a first aspect of the present disclosure, a charging gun holster for mounting a first charging gun or a second charging gun, includes a housing. The housing includes a socket inside, and the socket is formed by a circular groove connected to a cave, which the circular groove is formed by a first inner wall and the cave is formed by a second inner wall. The cave is configured to engage a head of the second charging gun. The circular groove is configured to engage a head of the first charging gun, and a first side of the housing is against a body of the first charging gun to limit the depth of the first charging gun inserting into the annular groove.

In some embodiments, a diameter of the circular groove is greater than a diameter of the cave, such that an extension wall is formed between the first inner wall and the second inner wall, which the extension wall is configured to block the head of the first charging gun inserting into the cave.

In some embodiments, the first inner wall of the circular groove is configured to fit a shape of the head of the first charging gun.

In some embodiments, the second inner wall of the cave is configured to fit a shape of the head of the second charging gun.

In some embodiments, a first groove is caved on the top of a connecting wall between the first side and a second side opposite to the first side of the housing, wherein the first groove is configured to engage a hook of the first charging gun.

In some embodiments, multiple fins are disposed protrudently on the connecting wall within the first groove, and the multiple fins comprise an incline plane and a perpendicular plane. The hook of the first charging gun is trapped by the first groove, and engagingly cooperated with the plurality of fins, the incline plane and the perpendicular plane.

In some embodiments, the housing further comprises a second groove caved on an opposite side of the first groove, of the first inner wall of the circular groove, and the second groove is configured to accommodate a convex strip of the head of the first charging gun, which the convex strip is disposed on an opposite side of the hook, of the first charging gun.

In some embodiments, the housing further comprises a bulge protrudently disposed on a side on the second inner wall of the cave, and the bulge is configured to cooperate with a recess of the head of the second charging gun.

In some embodiments, the bulge comprises an incline plane and a perpendicular plane, and the bulge is trapped by the recess of the head of the second charging gun, which the bulge, the incline plane and the perpendicular plane of the bulge are cooperated with the recess of the head of the second charging gun.

According to a second aspect of the present disclosure, a charging device comprises a charging stand. The charging device also comprises at least one type of charging gun coupled to the charging stand. The charging device also comprises at least one charging gun holster according to the first aspect of the present disclosure, disposed on the charging stand. The at least one charging gun holster is configured to accommodate and engage the at least one type of charging gun.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

Like reference numbers and designations in the various drawings indicate like elements. It is also to be understood that the various exemplary implementations shown in the figures are merely illustrative representations and are not necessarily drawn to scale.

DETAILED DESCRIPTION OF THE INVENTION

Figure 1:
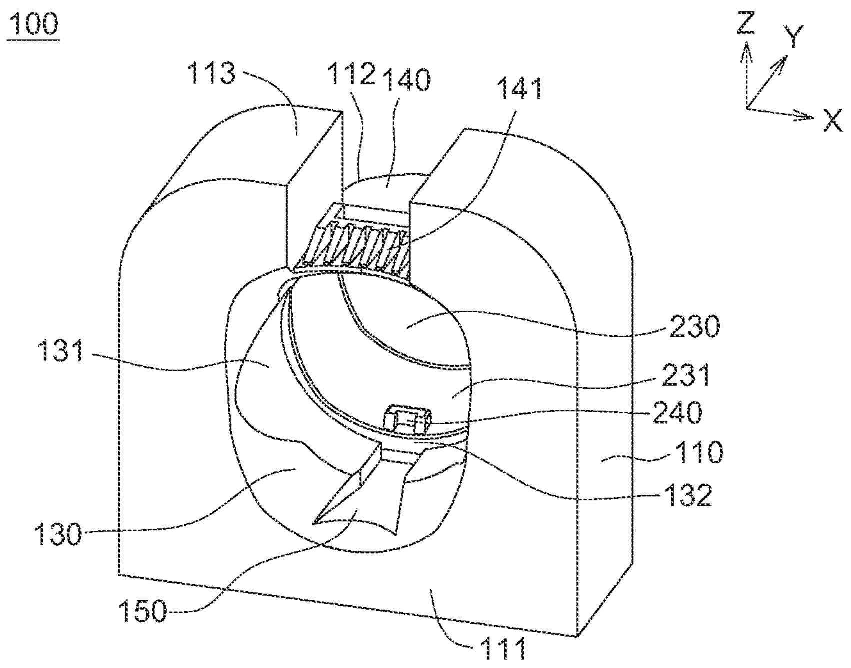
FIG. 1 is a schematic diagram illustrating a charging gun holster, according to one or more embodiments of the present disclosure.
Figure 2:
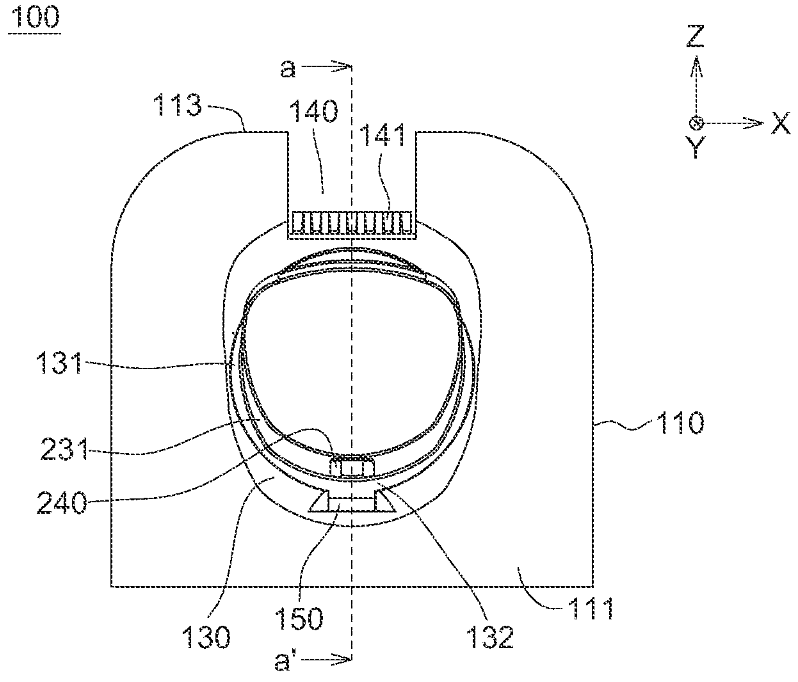
FIG. 2 is a schematic diagram illustrating the front view of a charging gun holster, according to one or more embodiments of the present disclosure.
Figure 3:
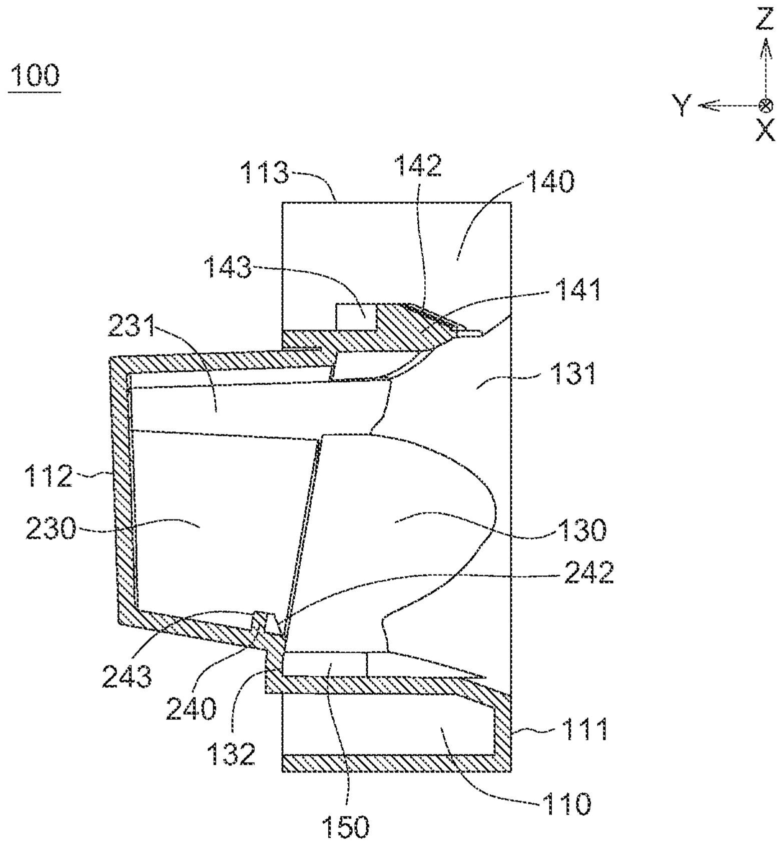
FIG. 3 is a schematic diagram illustrating a section view of the charging gun holster of FIG. 2 along the axis a-a', according to one or more embodiments of the present disclosure.

Referring to FIGS. 1-3, FIGS. 1-3 are schematic diagrams illustrating a charging gun holster 100, the front view of the charging gun holster 100 and, the section view of the charging gun holster 100 of FIG. 2 along the axis a-a', according to one or more embodiments of the present disclosure, respectively. In FIGS. 1-3, the charging gun holster 100 includes a housing 110. The housing 110 includes a first side 111 and a second side 112, which are disposed on two opposite sides of the housing 110.

Figure 4:
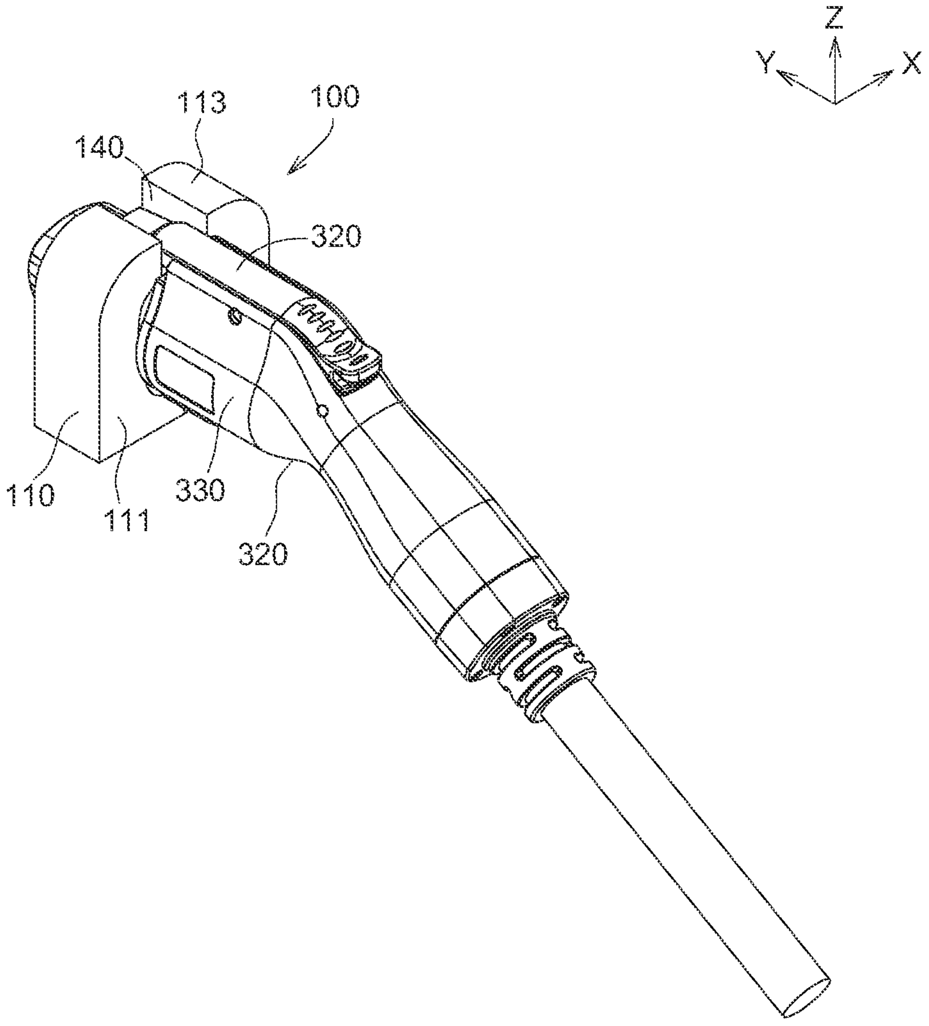
FIG. 4 is a schematic diagram illustrating the engagement of a charging gun holster and a first charging gun, according to one or more embodiments of the present disclosure.
Figure 5:
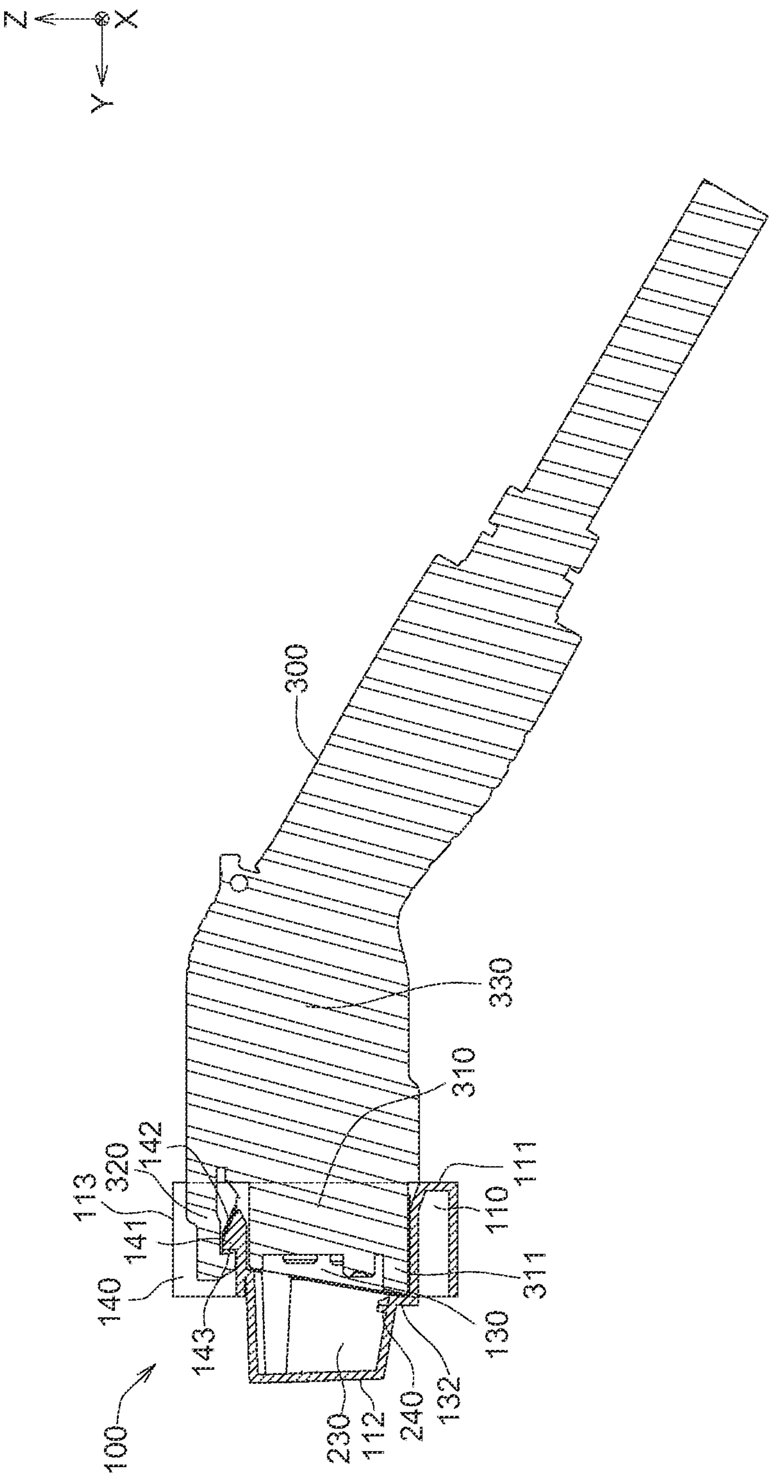
FIG. 5 is a schematic diagram illustrating a section view of the engagement of the charging gun holster and the first charging gun of FIG. 4, according to one or more embodiments of the present disclosure.

There is a socket on the first side 111 of the housing 110, which the socket is caved from the first side 111 extending toward the second side 112 (the Y direction as shown), and is connectively formed by a circular groove 130 and a cave 230. The circular groove 130 is formed by a first inner wall 131, and the cave 230 is formed by a second inner wall 231. Since the diameter of the circular groove 130 is greater than the diameter of the cave 230, an extension wall 132 is formed between the first inner wall 131 and the second inner wall 231 (inclinedly or perpendicularly extending along the Z direction as shown). The circular groove 130 is configured to be inserted by a head 310 (as shown in FIGS. 4 and 5) of a first type (such as J1772 type) of charging gun 300.

Figure 6:
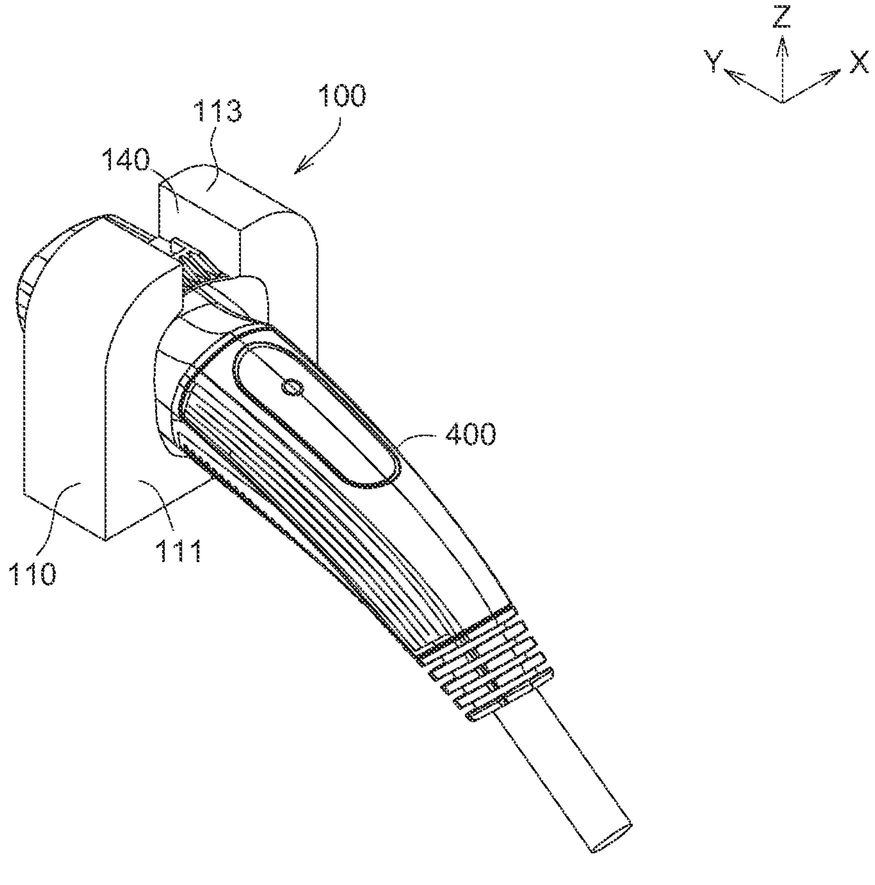
FIG. 6 is a schematic diagram illustrating the engagement of a charging gun holster and a second charging gun, according to one or more embodiments of the present disclosure.
Figure 7:
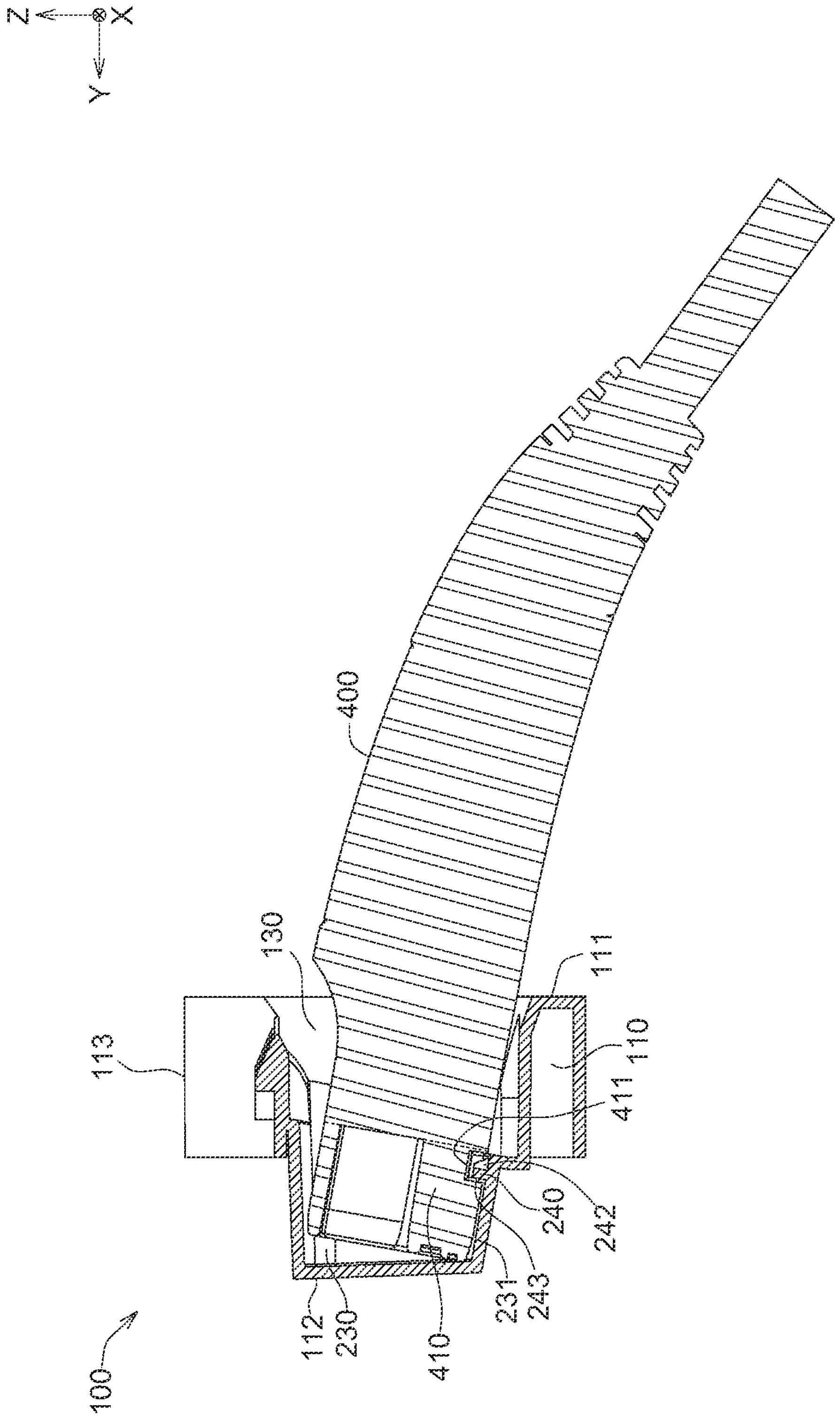
FIG. 7 is a schematic diagram illustrating a section view of the engagement of the charging gun holster and the second charging gun of FIG. 6, according to one or more embodiments of the present disclosure.

In some embodiments, the cave 230 in the housing 110 is configured to be inserted by a head of another type (such as NACS type) of charging gun (such as the head 410 of the second charging gun 400 of FIGS. 6 and 7).

The extension wall 132 can be used against the head of the charging gun (such as the head 310 of the first charging gun 300 of FIGS. 4 and 5), which prevents the head of the charging gun (such as the head 310 of the first charging gun 300 of FIGS. 4 and 5) in the circular groove 130 inserting into the cave 230, and it will be detailed described referring with FIG. 5 as follows. In some embodiments, according to the present disclosure, the extension wall 132 of the circular groove 130 can be generally identical to the open of the cave 230, such that the groove 230 can accommodate a part of the head of the charging gun (such as the head 310 of the first charging gun 300 of FIGS. 4 and 5) in the circular wall 130.

In some embodiments, a connecting wall 113 is formed between the first side and the second side of the housing 110, and a first groove 140 is caved on the top of the connecting wall 113. Multiple fins 141 are disposed protrudently on the connecting wall 113 within the first groove 140.

In some embodiments, as shown in FIG. 3, each of multiple fins 141 include an incline plane 142 and a perpendicular plane 143, and a hook 320 of the first charging gun 300 is trapped by the first groove 140, such that the hook 320 is engagingly cooperated with the multiple fins 141, the incline plane 142 and the perpendicular plane 142 of the multiple fins 141 (as shown in FIGS. 4 and 5).

In some embodiments, a second groove 150 is caved on the lower side of the first inner wall 131 of the circular groove 130, which the lower side is also the opposite side (along the Z direction) of the first groove (disposed on the upper side of the first inner wall 131), of the first inner wall 131 of the circular groove 130. The second groove 150 is configured to accommodate a convex strip (as shown in FIGS. 4 and 5) of the head of the charging gun (such as the convex strip 311 of the head 310 of the first charging gun 300 of FIGS. 4 and 5).

In some embodiments, a bulge 240 is disposed on a side of second inner wall 231 of the cave 230, such as the lower side of the second inner wall 231. The bulge 240 is configured to cooperate with a recess of the head of another type (such as NACS type) of charging gun (such as the recess 411 of the head 410 of the second charging gun 400 of FIGS. 6 and 7).

In some embodiments, the bulge 240 disposed on the second inner wall 231 of the cave 230, includes an incline plane 242 and a perpendicular plane 243, and the bulge 240 is trapped by the recess of the head of another type of charging gun (such as the recess 411 of the head 410 of the second charging gun 400 of FIGS. 6 and 7), such that the bulge 240, the incline plane 242 and the perpendicular plane 240 of the bulge 240 are cooperated with the recess of the head of another type of the charging gun (such as the recess 411 of the head 410 of the second charging gun 400 of FIGS. 6 and 7).

For the purpose of description, the first charging gun and the second charging gun describe in the following embodiments according to the present disclosure, are, but are not limited to, J1772 type charging gun and NACS type charging gun, respectively, as examples. Referring to FIGS. 4 and 5, FIGS. 4 and 5 are schematic diagrams illustrating the engagement of and charging gun holster 100 and the first charging gun 300 (such as the J1772 type charging gun), and the section view thereof, according to one or more embodiments of the present disclosure, respectively. In FIGS. 4 and 5, like reference numbers and designations indicate like elements of FIGS. 1 to 3 to facilitate the description. As shown, after the head 310 of the first charging gun 300 inserting into the circular groove 130, the circular groove 130 can fit the shape of the head 310 of the first charging gun 300, such that the head 310 of the first charging gun 300 can enter into the circular groove 130, and the first side 111 of the housing 110 is against the body 330 of the first charging gun 300 to limit the depth of the first charging gun 300 inserting into the circular groove 130.

In some embodiments, the diameter of the circular groove 130 is greater than the diameter of the cave 230 (as shown in FIGS. 1 to 3), thus the extension wall 132 between the first inner wall 131 and the second inner wall 231 is against the head 310 of the first charging gun 300, to prevent the head 310 of the first charging gun 300 entering into the cave 230.

To secure the head 310 of the first charging gun 300 (such as J1772 type charging gun) in the circular groove 130, the first groove 140 is caved on the top of the connecting wall 113, and multiple fins 141 including the incline plane 142 and the perpendicular plane 143, are disposed protrudently on the connecting wall 113 within the first groove 140. As shown in FIG. 5, when the head 310 of the first charging gun 300 inserts into the circular groove 130, the hook 320 of the first charging gun 300 firstly passes the incline plane 142 of the multiple fins 141, and then hooks the perpendicular plane 143 of the multiple fins 141, such that the hook 320 of the first charging gun 300 is engagingly cooperated with the incline plane 142 and the perpendicular plane 142 of the multiple fins 141, and the first charging gun 300 is securely engaged by the charging gun holster 100.

In some embodiments, when the head 310 of the first charging gun 300 inserts into the circular groove 130, as shown in FIG. 5, the second groove 150 caved on the opposite side of the first groove 140, of the first inner wall 131, can be used for being aligned and inserted by the convex strip 311 of the head 310 of the first charging gun 300 (as referring to FIG. 3) while inserting the head 310 of the first charging gun 300 into the circular groove 130 (as referring to FIG. 1), which facilitate to position the head 310 of the first charging gun 300 into the circular groove 130.

In some embodiments, as shown in FIG. 5, the bulge 240 disposed on the side of second inner wall 231 of the cave 230 can function with the extension wall 132 to block, but not be limited to, the head 310 of the first charging gun 300 entering into the cave 230.

Referring to FIGS. 6 and 7, FIGS. 6 and 7 are schematic diagrams illustrating the engagement of the charging gun holster 100 and the second charging gun 400 (such as the NACS type charging gun), and the section view thereof, according to one or more embodiments of the present disclosure. In FIGS. 6 and 7, like reference numbers and designations indicate like elements of FIGS. 1 to 3 to facilitate the description. As shown, since the diameter of the circular groove 130 is greater than the diameter of the cave 230 (as referring to FIG. 1), the circular groove 130 and its formed structures do not interfere the insertion of the head 410 of the second charging gun 410 inserting into the cave 230. As shown in FIG. 7, the cave 230 fits the shape of the head 410 of the second charging gun 410, such that the head 410 of the second charging gun 410 can be engaged by the cave 230.

To secure the head 410 of the second charging gun 400 (such as NACS type charging gun) in the cave 230, the bulge 240 is disposed on a side of the second inner wall 231 of the cave 230, for example. As shown in FIG. 7, when the head 410 of the second charging gun 400 inserts into the cave 230, the incline plane 242 of the bulge 240 can facilitate the head 410 of the second charging gun 400 passing the bulge 240. Then, the bulge 240 enters the recess 411 of the head 410 of the second charging gun 400, and the perpendicular plane 243 of the bulge 240 can facilitate the recess 411 of the head 410 of the second charging gun 400 hooking the bulge 240, such the second charging gun 400 is securely engaged by cave 230 of the charging gun holster 100.

Accordingly, it can be understood that the charging gun holster of the present disclosure can be applied to different types of charging guns for EVs, and through the structure of the charging gun holster of the present disclosure, the engagements for different types of charging guns for EVs are improved. The charging gun holster of the present disclosure can be used with replaced and/or upgraded charging guns for EVs, when the charging guns for EVs are replaced or upgraded, without replacing the corresponding charging gun holsters, thereby reducing the cost of replacing charging gun holsters. Thus, replaced and/or upgraded charging guns for EVs can securely engage with the charging gun holster of the present disclosure. In other cases, when there are multiple different types of charging guns for EVs, multiple charging gun holsters, such as multiple charging gun holsters of the present disclosure, can be used, without designing and developing individual charging gun holsters for individual charging guns for EVs. Molding and manufacturing of individual charging gun holster can be reduce to decrease costs of design or manufacturing for charging gun holsters without affecting the securely engagement of different types of charging guns for EVs.

Figure 8:
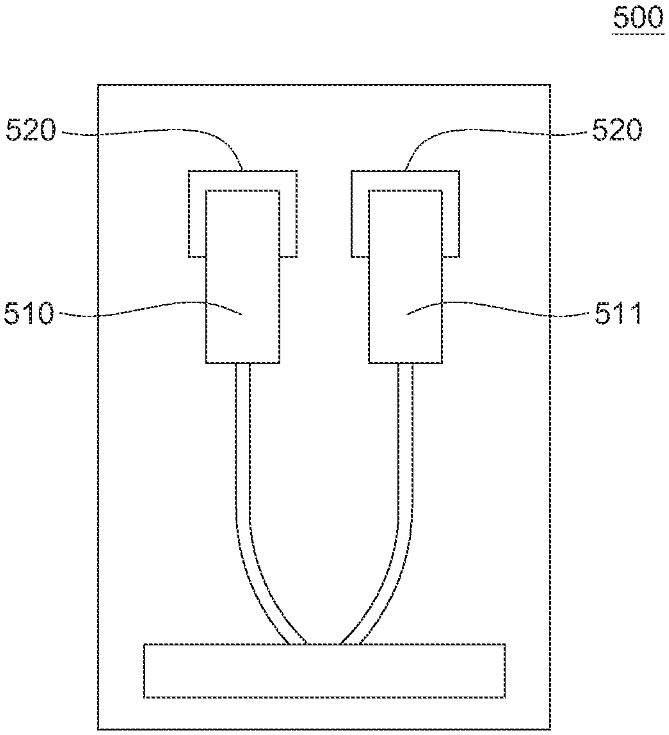
FIG. 8 is a schematic diagram illustrating a charging stand, according to one or more embodiments of the present disclosure.

Referring to FIG. 8, FIG. 8 is a schematic diagram illustrating a charging stand 500 with charging gun holsters (such as the charging gun holster 100 of FIGS. 1 to 7), according to one or more embodiments of the present disclosure. As shown in FIG. 8, the charging stand 500 comprises a charging gun 510 (such as the first charging gun 300 of FIGS. 4 and 5 or the second charging gun 400 of FIGS. 6 and 7, or such as NACS type, J1772 type and/or other types of charging guns) coupled to the charging stand 500, and a charging gun holster 520 of the embodiments above is disposed on the charging stand 500. When the charging gun 510 is replaced or upgraded, the charging stand 500 with the charging gun holster 520 of the present disclosure does not need to replace charging gun holster corresponding to the replaced or upgraded charging guns, such that the replaced or upgraded charging guns for EVs can be securely engaged in the same charging gun holster 520 originally disposed on the charging stand 500. In other cases, when the multiple charging guns 510 and 511 for EVs with different types are disposed on the charging stand 500, multiple charging gun holsters 520 of present disclosure can be used, without installing different charging gun holsters corresponding to the different types of charging guns (such as charging guns 510, 511) on the charging stand 500, such that the general manufacturing and designing costs of the charging stand 500 can be reduced.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A charging gun holster for mounting a first charging gun or a second charging gun, comprising:

a housing including a socket inside and formed by a circular groove connected to a cave, which the circular groove is formed by a first inner wall and the cave is formed by a second inner wall, wherein the cave is configured to engage a head of the second charging gun, wherein the circular groove is configured to engage a head of the first charging gun, and a first side of the housing is against a body of the first charging gun to limit the depth of the first charging gun inserting into the annular groove.

2. The charging gun holster of claim 1, wherein a diameter of the circular groove is greater than a diameter of the cave, such that an extension wall is formed between the first inner wall and the second inner wall, which the extension wall is configured to block the head of the first charging gun inserting into the cave.

3. The charging gun holster of claim 1, wherein the first inner wall of the circular groove is configured to fit a shape of the head of the first charging gun.

4. The charging gun holster of claim 1, wherein the second inner wall of the cave is configured to fit a shape of the head of the second charging gun.

5. The charging gun holster of claim 1, wherein a first groove is caved on the top of a connecting wall between the first side and a second side opposite to the first side of the housing, wherein the first groove is configured to engage a hook of the first charging gun.

6. The charging gun holster of claim 5, wherein a plurality of fins are disposed protrudently on the connecting wall within the first groove, and the plurality of fins comprise an incline plane and a perpendicular plane, wherein the hook of the first charging gun is trapped by the first groove, and engagingly cooperated with the plurality of fins, the incline plane and the perpendicular plane.

7. The charging gun holster of claim 6, wherein the housing further comprises a second groove caved on an opposite side of the first groove, of the first inner wall of the circular groove, and the second groove is configured to accommodate a convex strip of the head of the first charging gun, which the convex strip is disposed on an opposite side of the hook, of the first charging gun.

8. The charging gun holster of claim 1, wherein the housing further comprises a bulge protrudently disposed on a side on the second inner wall of the cave, and the bulge is configured to cooperate with a recess of the head of the second charging gun.

9. The charging gun holster of claim 8, wherein the bulge comprises an incline plane and a perpendicular plane, and the bulge is trapped by the recess of the head of the second charging gun, which the bulge, the incline plane and the perpendicular plane of the bulge are cooperated with the recess of the head of the second charging gun.

10. A charging device comprising:

a charging stand;

at least one charging gun coupled to the charging stand; and at least one charging gun holster for mounting the at least one charging gun, disposed on the charging stand, the at least one charging gun holster comprising:

a housing including a socket inside and formed by a circular groove connected to a cave, which the circular groove is formed by a first inner wall and the cave is formed by a second inner wall, wherein the cave is configured to engage a head of a second type of the at least one charging gun, wherein the circular groove is configured to engage a head of a first type of the at least one charging gun, and a first side of the housing is against a body of the first type of the at least one charging gun to limit the depth of the first type of the at least one charging gun inserting into the annular groove, wherein the at least one charging gun holster is configured to accommodate and engage at least the first type or the second type of the at least one charging gun.

11. The charging device of claim 10, wherein a diameter of the circular groove is greater than a diameter of the cave, such that an extension wall is formed between the first inner wall and the second inner wall, which the extension wall is configured to block the head of the first type of the at least one charging gun inserting into the cave.

12. The charging device of claim 10, wherein the first inner wall of the circular groove is configured to fit a shape of the head of the first type of the at least one charging gun.

13. The charging device of claim 10, wherein the second inner wall of the cave is configured to fit a shape of the head of the second type of the at least one charging gun.

14. The charging device of claim 10, wherein a first groove is caved on the top of a connecting wall between the first side and a second side opposite to the first side of the housing, wherein the first groove is configured to engage a hook of the first type of the at least one charging gun.

15. The charging device of claim 14, wherein a plurality of fins are disposed protrudently on the connecting wall within the first groove, and the plurality of fins comprise an incline plane and a perpendicular plane, wherein the hook of the first type of the at least one charging gun is trapped by the first groove, and engagingly cooperated with the plurality of fins, the incline plane and the perpendicular plane.

16. The charging device of claim 15, wherein the housing further comprises a second groove caved on an opposite side of the first groove, of the first inner wall of the circular groove, and the second groove is configured to accommodate a convex strip of the head of the first type of the at least one charging gun, which the convex strip is disposed on an opposite side of the hook, of the first type of the at least one charging gun.

17. The charging device of claim 10, wherein the housing further comprises a bulge protrudently disposed on a side on the second inner wall of the cave, and the bulge is configured to cooperate with a recess of the head of the second type of the at least one charging gun.

18. The charging device of claim 17, wherein the bulge comprises an incline plane and a perpendicular plane, and the bulge is trapped by the recess of the head of the second type of the at least one charging gun, which the bulge, the incline plane and the perpendicular plane of the bulge are cooperated with the recess of the head of the second type of the at least one charging gun.

* * * * *